United States Patent [19]

Hsu

[11] Patent Number: 4,919,292
[45] Date of Patent: Apr. 24, 1990

[54] REINFORCED JUNCTION BOX ASSEMBLY

[76] Inventor: Tsui-Chen Hsu, No. 12, Alley 66, Lane 275, Nan-Tun Rd., Sec. 1., Taichung, Taiwan

[21] Appl. No.: 309,781

[22] Filed: Feb. 10, 1989

[30] Foreign Application Priority Data

Jan. 11, 1989 [TW] Taiwan .............................. 77/200,240

[51] Int. Cl.$^5$ ............................................. H02G 3/08
[52] U.S. Cl. ....................................... 220/3.2; 174/61; 248/343
[58] Field of Search .................. 174/50, 52.1, 53, 54, 174/55, 56, 61, 62, 63, 64; 220/3.2, 3.3, 3.5, 3.6; 248/343; 362/147, 404, 406; 416/5, 170 C

[56] References Cited

U.S. PATENT DOCUMENTS

| | | | |
|---|---|---|---|
| 4,096,554 | 6/1978 | Greene | 362/404 X |
| 4,714,230 | 12/1987 | Huang | 248/343 X |
| 4,770,311 | 9/1988 | Wang | 220/3.2 X |

Primary Examiner—Laramie E. Askin
Attorney, Agent, or Firm—Marshall & Melhorn

[57] ABSTRACT

A reinforced junction box assembly includes: a polygonal open housing body with a top surface on one side and a plurality of side walls vertically formed along the periphery of the top surface; at least one pair of holding flanges each with a guide opening in the middle separately provided along an edge of two opposing sides of the open housing body structure; and at least one pair of mounting members each with a reinforced ridge and two mounting sides respectively fixed on an interior surface of the two opposing side walls against the holding flange. In addition, each of the mounting members includes a threaded bore in the reinforced ridge, which is aligned with the guide opening of the respective holding flange, and a plurality of screw holes in the mounting sides, which are used to fix the mounting members on the opposing side walls. Thereby, safe connections can be ensured all the time between the mounting members and a suspension load through the guide openings and the threaded bores.

2 Claims, 3 Drawing Sheets

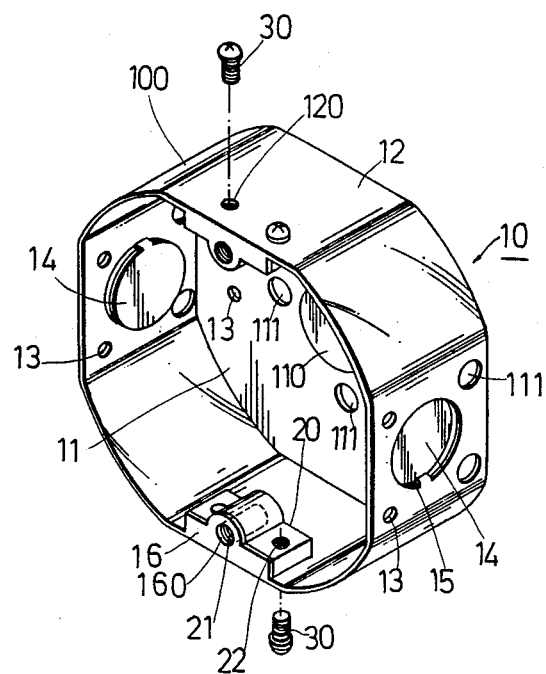
F I G. 2

REINFORCED JUNCTION BOX ASSEMBLY

BACKGROUND OF THE INVENTION

This invention relates to a junction box assembly, and more particularly to a reinforced junction box assembly having a plurality of holding flanges and mounting members adapted for safely securing the suspension mechanism of an electrical appliance.

Conventionally, junction boxes are usually prearranged in a ceiling wall or a wooden beam for making connections with an electrical appliance. As shown in FIG. 1, the known junction box 1 embedded in the ceiling wall A includes a knockout hole 1A formed in one side for the leading-in of a power line therefrom, and a pair of curved tabs 1B provided on opposing sides of the open section of the junction box 1, each curved tab 1B being provided with a threaded screw hole 1C for being connected to a suspension mechanism 1D of an electrical appliance 5 through a pair of screw bolts 3. Problems suffered by the known junction boxes are as follows:

(1) Since the suspension mechanism of an electrical appliance is completely supported by the curved tabs 1B through threaded screw-connections, and the curved tabs 1B are usually formed of a thin metal structure, the strength of the curved tabs 1B and the threads of the screw holes 1C can hardly withstand the suspended load for an extended time. As a result, the threaded screw holes of the curved tabs 1B may eventually become damaged and even break, possibly causing the dropping of the suspended load therefrom.

(2) If the suspended load is a moving appliance such as a ceiling fan, after a certain period, the constant vibration of the ceiling fan may cause the screw bolts in the thinly formed threaded screw holes of the curved tabs 1B to become loose, eventually causing the ceiling fan to fall to the ground.

SUMMARY OF THE INVENTION

It is accordingly a primary object of the present invention to provide a reinforced junction box assembly having a plurality of holding flanges and mounting members adapted for ensuring safe connections to be made therewith.

This and other objects of the present invention are achieved by providing a reinforced junction box assembly, which comprises: an open and polygonal housing body with a top surface on one side and a plurality of side walls vertically formed along the periphery of the top surfaced; at least one pair of holding flanges, each with a guide opening in the middle integrally provided at each exterior edge of two opposing side walls and located in opposite directions; and at least one pair of mounting members each having a reinforced mounting ridge in the middle with a threaded bore provided therein respectively fixed on the interior surfaces of the opposing side walls against the holding flanges with the threaded bore located in line with the corresponding guide openings of the holding flanges. The top surface of the open housing body is provided with a mounting opening to be used to secure the open housing body to the ceiling during construction, and a plurality of threaded screw holes formed around the mounting opening for arranging a grounding wire or fixing a clamp therein. In addition, each one of another opposing side walls of the open housing body, upon which there is no holding flange, includes a knockout opening for the leading-in of power lines through a conduit connected to the knockout opening, and a plurality of screw holes for fastening the periphery of the open housing body to the ceiling during construction. Moreover, each of the mounting members is preferably made of a die-cast metallic block so as to provide sufficient supporting strength therewith.

Other advantages and characteristics of the present invention will become apparent from the following detailed description of a preferred embodiment when read in conjunction with the accompanying drawings.

BRIEF DESCRIPTION OF THE DRAWINGS

FIG. 2 is a perspective view of a preferred embodiment of a junction box assembly according to the present invention;

DETAILED DESCRIPTION OF THE PREFERRED EMBODIMENT

Figure 1:
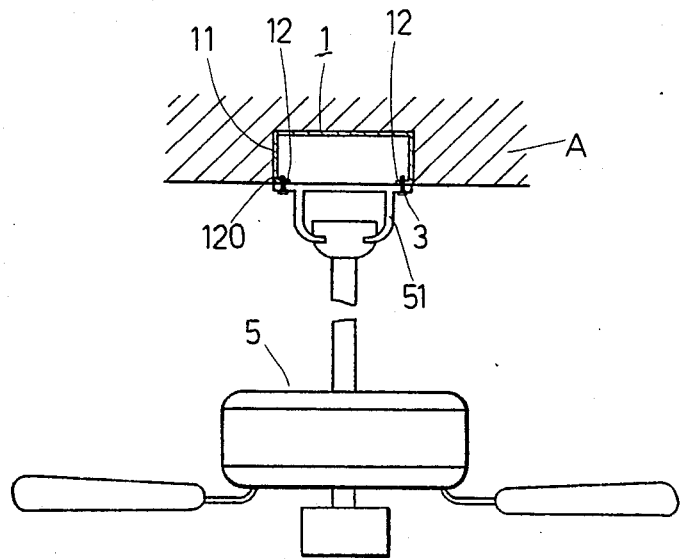
FIG. 1 is an illustrative view of a known junction box assembly.

Referring to FIG. 2, the preferred embodiment of a reinforced junction box assembly 10 according to the present invention comprises: a polygonal open housing body 100, having a top surface 11 on one side and a plurality of side walls 12 vertically formed along the periphery of said top surface 11; at least one pair of holding flanges 16, each having a guide opening 160 provided in the middle thereof, integrally formed along each end edge of two opposing side walls 12 with the end of each holding flange 16 separately extending toward each other in the open housing body 100; and at least one pair of mounting members 20, each having a threaded bore 21 in the middle of a reinforced ridge and a pair of screw holes in the opposing mounting sides thereof, respectively fixed on the interior surface of two opposing side walls 12 against the holding flanges 16 with the threaded bore 21 of each mounting member 20 aligned with the guide opening 160 and the screw holes 22 aligned with a plurality of holes 120 formed in the opposing side walls 12 so as to screw-connect each mounting member 20 to the corresponding interior surface of the two opposing side walls 12 through a plurality of screws 30. It shall be appreciated that the mounting members 20 can be either rivetted or welded on the interior surfaces of the two opposing side walls 12 without using the screws 30. In addition, the open housing body 100 is also provided with a plurality of knockouts 14 in the other opposing side walls thereof for being moved to define a plurality of side openings 15 therein for the leading-in of electrical power lines installed through conduits, and a plurality of screw holes 13 for being used to fix the open housing body 100 more securely in the ceiling as well as to attach a clamp thereto for keeping the electrical wires in position in the open housing body 100. It is to be noted that each of the mounting members 20 is preferably formed as a die-cast solid metallic block, and the threaded bore 21 in the reinforced ridge is located in axial intersection with the locations of each screw hole 22, so that, with the mounting members 20 being firmly fixed on the interior surfaces of the opposing side walls 12, safe supporting can be ensured therewith.

Figure 3:
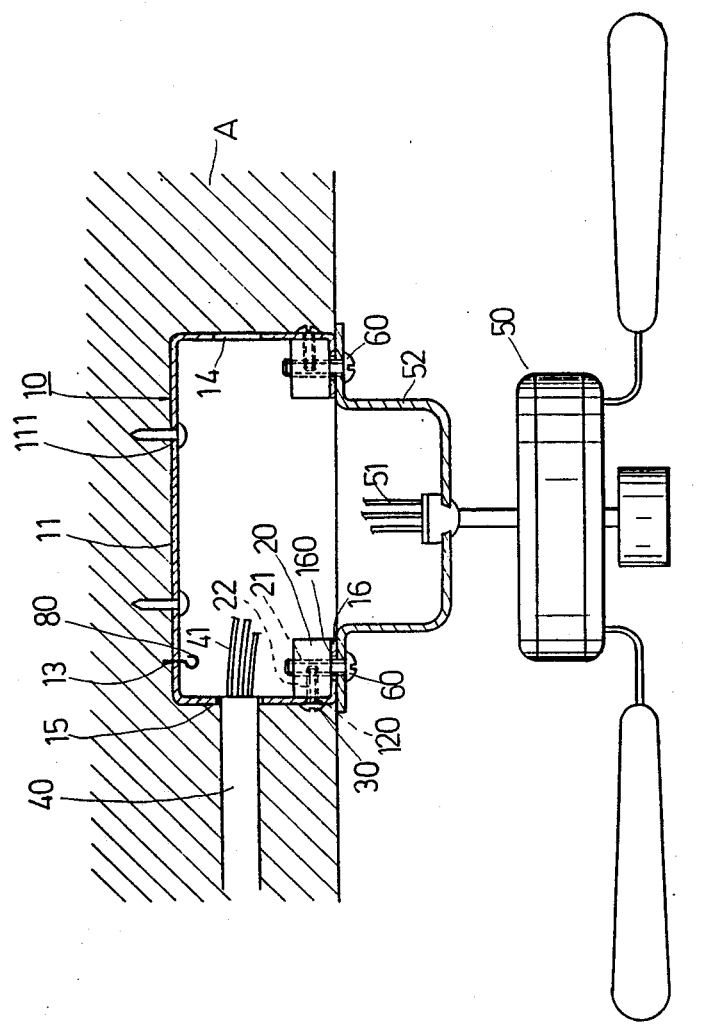
FIG. 3 is a perspective and partially sectional view of the preferred embodiment shown in FIG. 2, which is fixed in the ceiling wall of a building and connected to a suspended load.

Referring to FIG. 3, when the preferred embodiment of the reinforced junction box assembly 10 is secured in the ceiling wall A, connections of a suspension load, such as a ceiling fan 50, can be securely made therewith. As shown in the FIG. 3, a wire conduit 40 is disposed in the side opening 15 defined by removing the knockout 14, and the suspension mechanism 52 of the ceiling fan 50 is screw-connected to the opposing mounting members 20 through screw bolts 60 which are respectively secured in the threaded bores 21 of the mounting members 20 through the guide openings 160 of the holding flanges 16 of the open housing body 100 with the electrical wires 51 of the ceiling fan 50 being electrically connected to the power lines 41 within the junction box 10. In addition, a clamp 80 is fixed on the top surface 11 through screw holes 111, which is used to keep electrical wires in position in the open housing body 100. With the solid support of the mounting members 20 and the thickly threaded bores 21, safe support for the suspended load 50 can be completely and continually ensured.

While a preferred embodiment of the present invention has been illustrated and described, it will be apparent that many changes may be made in the general construction and arrangement of the invention without departing from the spirit and scope thereof, and it is therefore desired that the invention not be limited to the exact disclosure but only to the extent of the appended claims.

What I claim is:

1. A reinforced junction box assembly having a polygonal open housing body formed with a top surface on one side thereof, a plurality of side walls vertically located along a periphery of the top surface, and at least one pair of holding flanges, each one of which has a guide opening in a middle portion thereof, integrally formed along each outer edge of two opposing side walls of the open housing body for providing an anchor position thereat; the improvement comprising:

at least one pair of mounting means, each having a reinforced ridge formed between two mounting sides thereof with a threaded bore extending through said reinforced ridge, and a plurality of screw holes formed in said mounting sides for fixing the mounting means on an interior surface of the two opposing side walls of the housing body against the holding flanges thereof, with the threaded bores of said mounting means aligned with the guide openings of the holding flanges; both of said mounting means being fixed to an interior surface of the two opposing side walls against the holding flanges, whereby safe connections between said mounting means and a suspension load can be effectively made through the guide openings of the holding flanges and the threaded bores of said mounting means.

2. A reinforced junction box assembly according to claim 1 wherein each mounting means is a die-cast, solid metallic block and the threaded bore thereof is located so as to axially intersect the plane formed by the axes of said screw holes thereof so that reliable supporting capability can be achieved therewith.

* * * * *